US012784483B1

(12) United States Patent
Buban et al.

(10) Patent No.: US 12,784,483 B1
(45) Date of Patent: Nov. 3, 2026

(54) PROCESSING DOCUMENTS TO IDENTIFY TEXT ASSOCIATED WITH VISUAL ELEMENTS

(71) Applicant: Doma Technology LLC, San Francisco, CA (US)

(72) Inventors: James P. Buban, Knoxville, TN (US); Anupam Kulkarni, San Francisco, CA (US); Allen Ko, Oakland, CA (US)

(73) Assignee: Doma Technology LLC, San Francisco, CA (US)

( * ) Notice: Subject to any disclaimer, the term of this patent is extended or adjusted under 35 U.S.C. 154(b) by 506 days.

(21) Appl. No.: 17/948,144

(22) Filed: Sep. 19, 2022

(51) Int. Cl.

| | |
|---|---|
| ***G06V 30/19*** | (2022.01) |
| ***G06F 40/284*** | (2020.01) |
| ***G06V 10/82*** | (2022.01) |
| ***G06V 30/146*** | (2022.01) |
| ***G06V 30/412*** | (2022.01) |

(52) U.S. Cl.
CPC ...... *G06V 30/19173* (2022.01); *G06F 40/284* (2020.01); *G06V 10/82* (2022.01); *G06V 30/147* (2022.01); *G06V 30/19147* (2022.01); *G06V 30/1918* (2022.01); *G06V 30/412* (2022.01)

(58) Field of Classification Search
CPC ............. G06V 30/19173; G06V 10/82; G06V 30/147; G06V 30/19147; G06V 30/1918; G06V 30/412; G06F 40/284
See application file for complete search history.

(56) References Cited

U.S. PATENT DOCUMENTS

| | | | |
|---|---|---|---|
| 5,361,201 A | 11/1994 | Jost et al. | |
| 10,402,640 B1 | 9/2019 | Becker et al. | |
| 10,839,245 B1 * | 11/2020 | Dhillon | G06F 18/217 |
| 11,367,297 B2 | 6/2022 | Bildner et al. | |
| 11,715,310 B1 | 8/2023 | Sammons et al. | |
| 2011/0222771 A1 | 9/2011 | Cimpoi et al. | |

(Continued)

OTHER PUBLICATIONS

Devlin et al "BERT: Pre-training of Deep Bidirectional Transformers for Language Understanding," in NAACL-HLT, Oct. 2018, 16 pages.

(Continued)

*Primary Examiner* — Amara Abdi
(74) *Attorney, Agent, or Firm* — Walters IP Law; Gregory A. Walters

(57) ABSTRACT

Methods, systems, and apparatus, including computer programs encoded on computer storage media, for processing documents. One of the methods includes receiving one or more page images from a document; for each page image: extracting text data for the page image, providing the page image to one or more computer vision neural network models, trained to output a predicted classification of coordinates for one or more regions within the image as belonging to a classification associated with a visual element of the page, combining the extracted text data and information associated with the visual elements identified by the one or more computer vision neural network models to generate combined page data, and providing the combined page data to a transformer based machine learning model configured to generate prediction that particular text of the page is classified as being associated with a particular visual element of the page.

33 Claims, 6 Drawing Sheets

(56) References Cited

U.S. PATENT DOCUMENTS

| | | | | |
|---|---|---|---|---|
| 2019/0019020 | A1 | 1/2019 | Flament et al. | |
| 2019/0026577 | A1 | 1/2019 | Hall et al. | |
| 2019/0180115 | A1 | 6/2019 | Zou | |
| 2020/0117718 | A1* | 4/2020 | Lundberg | G06F 18/214 |
| 2020/0160050 | A1* | 5/2020 | Bhotika | G06V 30/414 |
| 2020/0302208 | A1* | 9/2020 | Hoehne | G06N 3/08 |
| 2020/0372623 | A1 | 11/2020 | Lawlor et al. | |
| 2020/0394567 | A1 | 12/2020 | Choe et al. | |
| 2021/0019512 | A1 | 1/2021 | Uppal et al. | |
| 2021/0043211 | A1* | 2/2021 | Leidner | G10L 15/26 |
| 2023/0081171 | A1* | 3/2023 | Zhang | G06T 11/00 382/157 |
| 2023/0230406 | A1* | 7/2023 | Mehra | G06V 30/10 382/175 |
| 2023/0343126 | A1* | 10/2023 | Salacinski | G06V 30/1448 |
| 2023/0401386 | A1* | 12/2023 | Wang | G06F 16/35 |
| 2023/0419020 | A1* | 12/2023 | Glushnev | G06V 30/416 |

OTHER PUBLICATIONS

Vaswani et al., “Attention Is All You Need,” NIPS, Dec. 2017, 15 pages.

Xu et al. “LayoutLM: Pre-training of Text and Layout for Document Image Understanding,” KDD ’20: Proceedings of the 26th ACM SIGKDD International Conference on Knowledge Discovery & Data Mining, Aug. 2020, pp. 1192-1200.

* cited by examiner

PROCESSING DOCUMENTS TO IDENTIFY TEXT ASSOCIATED WITH VISUAL ELEMENTS

BACKGROUND

This specification relates to processing documents using machine learning models. Machine learning models can be trained to generate a particular type of output from a given input. Typically, a machine learning model is trained using a collection of labeled training data. The machine learning model can be trained such that the model correctly classifies the input training data. New data can then be input into the machine learning model to determine a predicted classification for the new data.

SUMMARY

Machine learning models can be used to classify data as belonging a particular type or category. This specification describes a system that use one or more machine learning models to process input documents. For example, the system can include one or more computer vision models, for example, region-based convolutional neural network (RCNN) models, to process input images of document pages to predict locations and types of data found within the input images. In some implementations, the predicted locations are coordinates defining bounding boxes at particular locations in the image corresponding to particular types of visual elements. Each bounding box can be labeled by the neural network according to a set of available classifications. The output of the computer vision models can be combined with data about text content of the same document pages and input into another machine learning model used to classify particular text as predicted to be associated with visual elements of the document page. For example, a transformer based machine learning model can be used to classify text as associated with respective visual elements. The output classifications can be used for further downstream processing including verifying the text content associated with the classification as compared to stored data.

The subject matter described in this specification can be implemented in particular embodiments so as to realize one or more of the following advantages. Using machine learning models eliminates the need for manual document review, which reduces the time needed to evaluate incoming data. Errors in transcription and in understating the data can be greatly reduced. In particular, using a neural network to perform computer vision can more accurately and quickly be used to process input images to identify the content of interest as compared to human evaluators and prior computer systems. Combining information about visual elements and text from a document allows a machine learning model to classify text associated with visual elements that would conventionally require manual interpretation. Furthermore, the machine learning models may be trained to further classify whole documents in a similar manner.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

Figure 1:
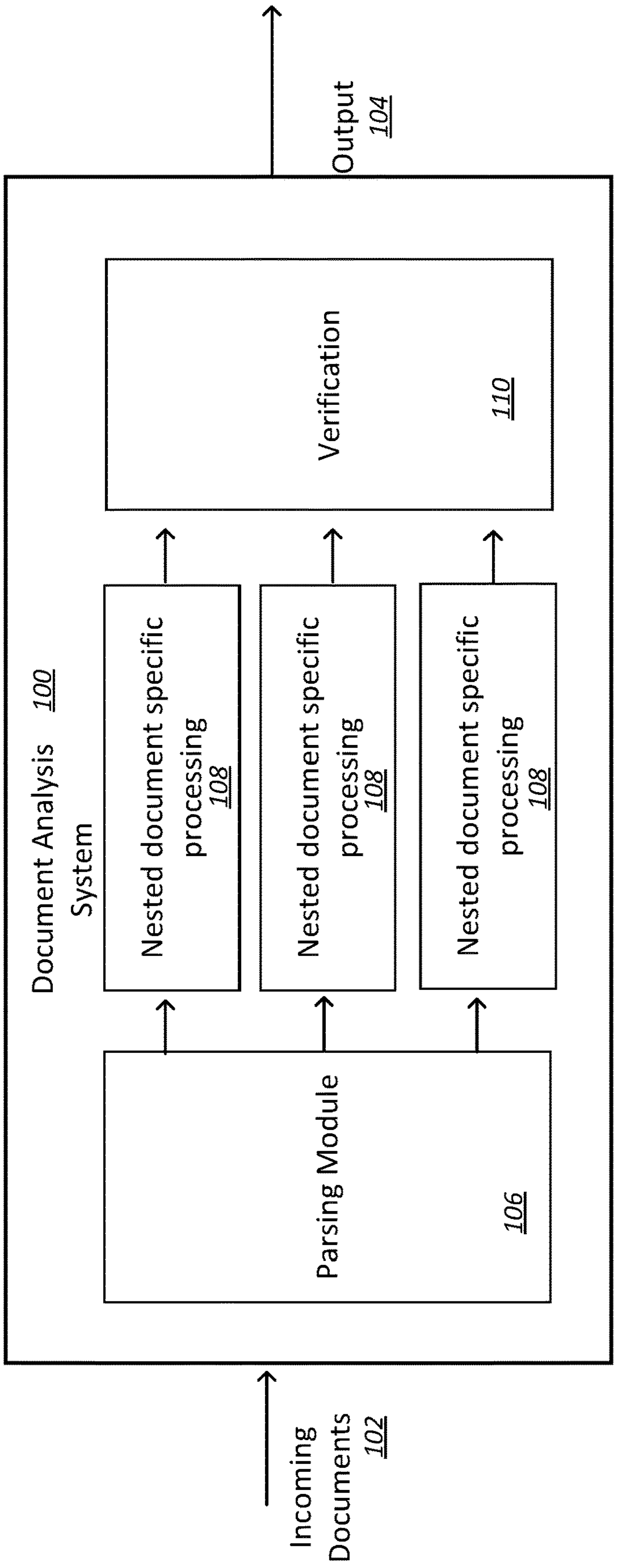
FIG. 1 is an example system.

Documents can include both textual content and visual elements. Conventional machine learning models employ various forms of language models that can be used to semantically understand textual content and to generate various output predictions. Visual elements in the document are less likely to be considered by such machine learning models. However, in some cases, a classification of the text associated with particular visual elements is sought.

Computer vision relates to how computers can be used to understand the content of digital images. For example, computer vision techniques seek to teach computers how to recognize particular objects in images, detect their locations or even completely segment an image by classifying each pixel as belonging to a predefined class.

This specification describes a document analysis system using a machine learning model that is trained to evaluate incoming data about not only the text content of a document (or document portion such as a page), but also particular tokens related to visual elements identified within the document. The machine learning model then generates a predicted classification of particular text within the document as associated with the corresponding visual element.

To identify the visual elements in the documents, one or more trained computer vision models can be used to analyze a document image and generate labeled bounding boxes corresponding to particular visual elements. In some implementations, the computer vision model or models are region-based convolutional neural networks that performs a number of convolution operations on portions of an input image and uses the output of the convolutions to generate predicted classifications for particular visual elements.

The visual elements are then merged with textual data for input to the machine learning model that classifies the text associated with the visual elements. For example, information about the bounding boxes for visual elements identified using the computer vision models are inserted at particular points in sequential text data based on the locations of the bounding boxes.

For example, visual elements in the document can include checkboxes, both checked and unchecked, and signature lines. The computer vision model or models can be used to identify bounding boxes for these visual elements. As discussed in greater detail below, merging the information can include indicating the presence of a checkbox visual element at a location to the left of text corresponding to that location of the document. Similarly, merging the information can include indicating the presence of a signature line at a location above particular text or to the left of text corresponding to that location in the document.

In some implementations, the document analysis system can be a title production system for real property transactions. A title production system is used by title companies to manage workflows and work with various third parties involved in the transaction. During a typical real property transaction, there are a number of actions that need to take place, for example, to generate a title insurance policy for the real property transaction, generate closing documents, etc. To facilitate these actions there are a number of documents that need to be understood and checked for inconsistencies.

For example, one document can describe a mortgage that is taken as part of the real estate transaction. This document can include lines for signatures by the buyers and one or more checkboxes denoting certain conditions associated with the mortgage that may or may not be checked. It can be important to verify the names of the signatories and the checkbox conditions that apply. The one or more computer vision models can be used to identify bounding boxes corresponding to signature lines, unchecked boxes, and checked boxes. The subsequent machine learning model can then use this information along with the text data to classify particular text as associated with the visual elements. For example, by classifying particular text found beneath the signature line as a potential signatory name. These classifications can be further evaluated by subsequent processing, for example, to verify that the names or conditions match what is expected. In particular, the system can apply similar techniques to variations on the document as well as to different types of documents based on the applied training.

System

FIG. 1 is an example system 100. The system 100 can be (or be a subsystem of) a document analysis system including, for example, a title production system. In particular, in some instances, the system 100 is a document analysis system that analyzes input documents 102 to generate one or more outputs 104.

The document analysis system 100 includes a parsing module 106. The parsing module 106 extracts particular components from the input data, e.g., an image or set of images. For example, the input document can be a compilation of a number of different component documents each having one or more pages. In some instances, different component documents can be structured documents having a particular layout corresponding to a form type. The document can include metadata encoding the text within one or more page images. Alternatively, the parsing can include performing a character recognition process, e.g., OCR, to identify the text of the image.

The parsing module 106 can separate out this input document to separate documents of interest. Furthermore, in some implementations, each component document of interest is further separated into individual pages.

Not all component documents need be processed, depending on the content of the document. For example some document may be boilerplate disclosures. However, other documents having particular structures or layouts can be identified and extracted from the document and routed to a corresponding processing stream 108. For example, documents of interest relating to a real estate transaction can include a Note, mortgage, closing disclosure, 1003 form, and payoff statement. Different processing can be applied to the respective documents depending on the nature of the document and the information that needs to be obtained from each. Thus, after extraction each of these documents is processed according to the document specific processing 108 for that document. The below described processing steps with respect to FIGS. 2-6 may be applied in one or more of the document specific processing steps 108.

The output of the document processing can be provided to a verification module 110. The verification module 110 may be used to perform various analyses or comparisons of the processed data to expected data (e.g., from a file or other storage location). For example, the verification module 110 can perform a comparison between extracted names associated with a transaction to the stored names associated with the transaction to confirm that they match. Other types of comparisons can include comparing vesting information, conditions, loan amount, and other details of a transaction.

Document Processing

Figure 2:
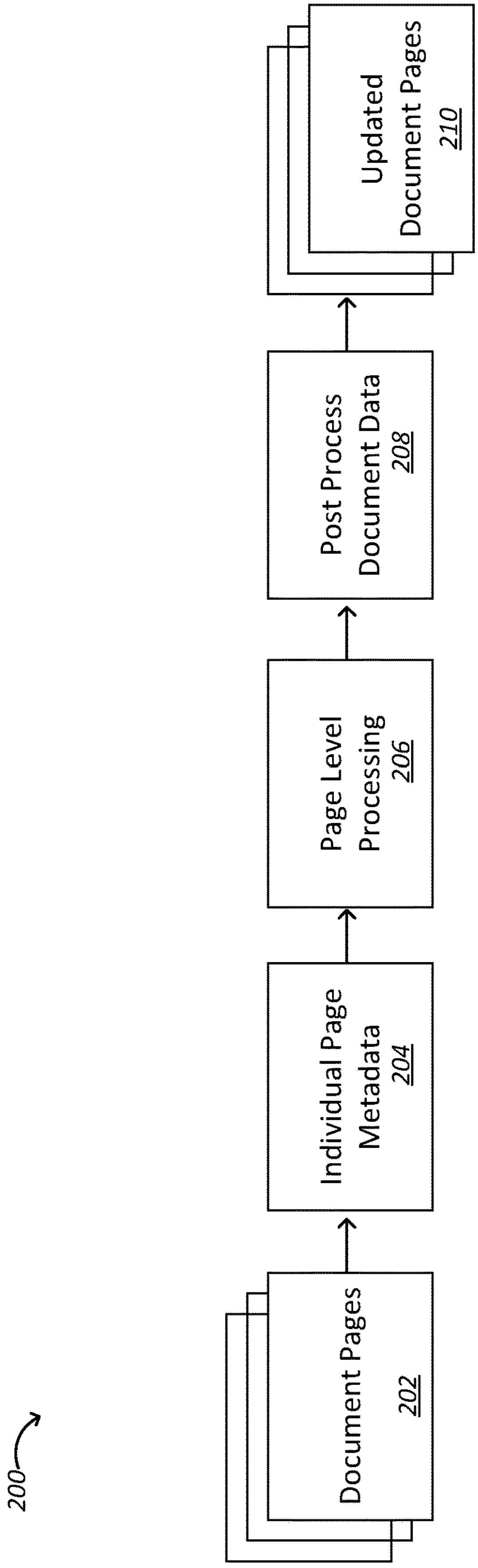
FIG. 2 is an example processing pipeline for processing document pages.

FIG. 2 is an example processing pipeline 200 for processing document pages 202. In particular, FIG. 2 can represent the processing pipeline corresponding to the document specific processing 108 of a particular document. The document can be divided into individual pages. The processing pipeline 200 can then be performed iteratively, or in parallel, for each document page. In some implementations, the results of each document page are combined to generate output results for an entire component document. The processing pipeline 200 can be described as performed by a system, e.g., document analysis system 100 of FIG. 1.

For a given document page, the system obtains individual page metadata 204. The individual page metadata 204 includes an image representation of the page as well as data extracted from the document page. The data extracted from the document page can include encoded metadata of the document, e.g., of a PDF document, that describes the text content and corresponding locations within the document page. In some alternative implementations, an optical character recognition (OCR) process is performed on the page image to generate text encoding metadata for the text content rather than it being received as already encoded within the document.

Based on the individual page metadata 204, the system performs page level processing 206. The page level processing is described in greater detail below with respect to FIG. 3. In brief, the page level processing includes applying one or more machine learning models to generate a predicted classification for one or more portions of the document.

The system uses the output of the page level processing 206 to post process document data 208 including replacing the original page metadata with updated page metadata resulting from the page level processing 206.

The updated page metadata is added to the document page to generate an updated document page 210 that appends the output results to the document page. For example, a result of the page level processing 206 can be a classification of text as being associated with a signature line in the document page. The updated metadata for the document page can include the labeled data so that later processing of the document pages, e.g., for verification, can pull the labeled data to use in the processing.

Figure 3:
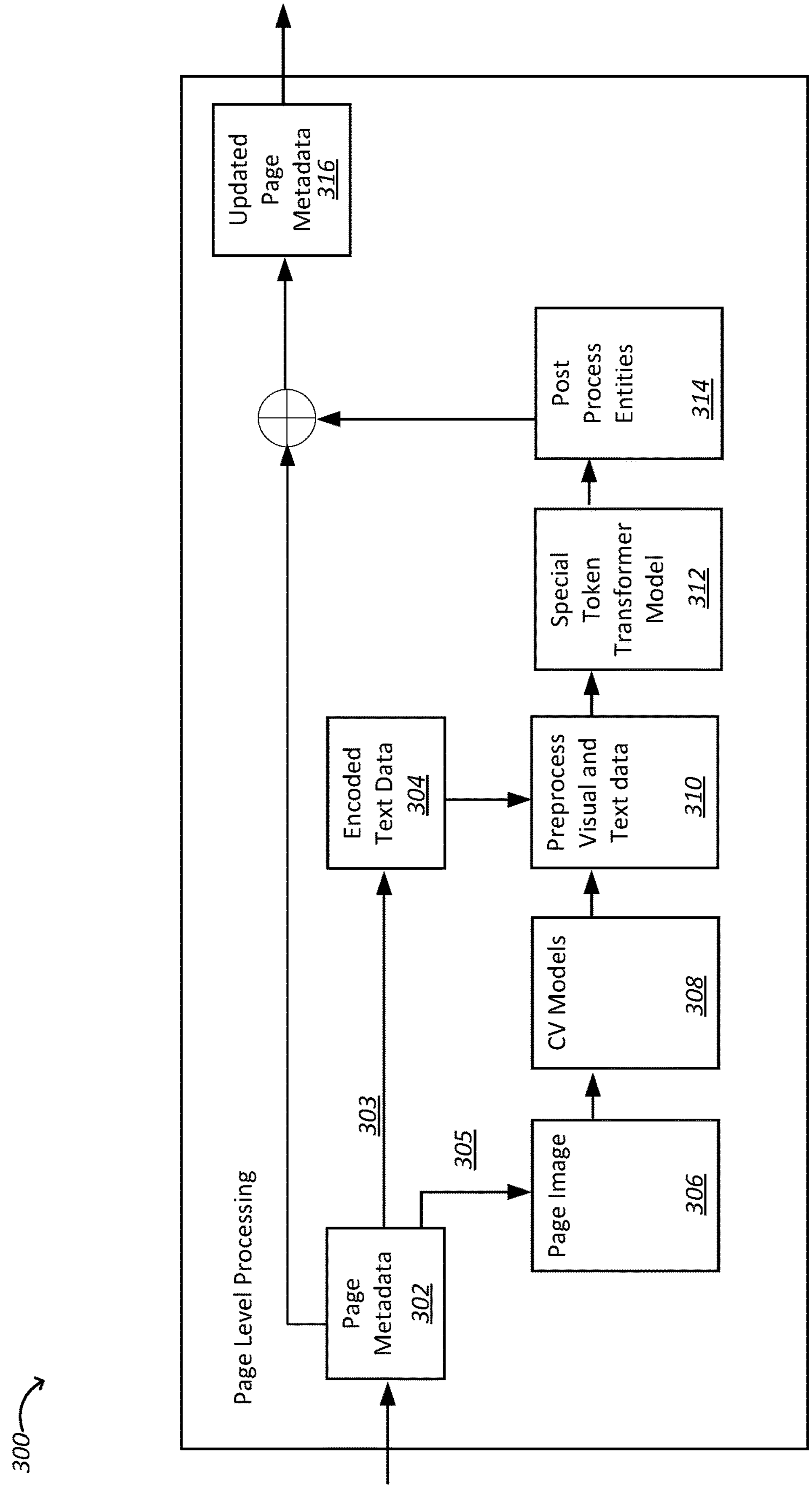
FIG. 3 is an example processing pipeline for page level processing.

FIG. 3 is an example processing pipeline 300 for performing page level processing. In particular, FIG. 3 can represent the processing pipeline corresponding to page level processing 206 of a given document page 202 as shown in FIG. 2. The processing pipeline 300 can be described as performed by a system, e.g., document analysis system 100 of FIG. 1.

The processing pipeline 300 begins with receiving page metadata 302, e.g., the individual page metadata 204 of FIG. 2. The page metadata 302 is separated along two paths of the processing pipeline 300. The first path 303 takes the textual information in the page metadata 304, e.g., the text encoding and corresponding text positions within the page of the document.

The second path 305 takes the image representation of the page 306. The page image is then input to one or more computer vision models 308. In some implementations, a single computer vision model is trained to identify different types of visual elements. In another implementation, two or more computer vision models are trained to identify particular types of visual elements. For example, a first computer vision model can be trained to identify signature lines within an image of a document page while a second computer vision model can be trained to identify checked and unchecked checkboxes within the image of the document page.

Figure 4:
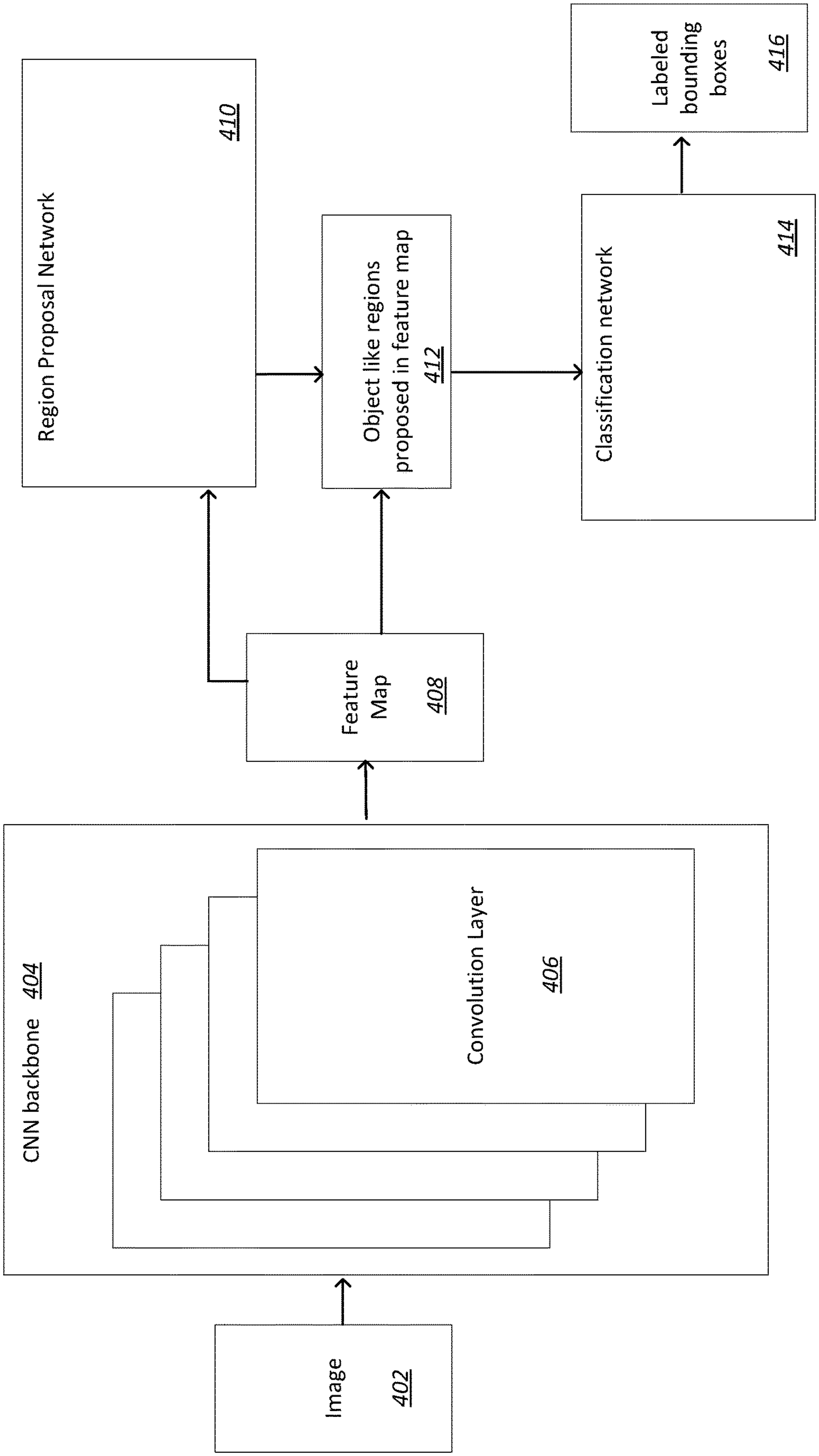
FIG. 4 is a diagram of an example architecture for applying computer vision models to an image.

The computer vision model or models, described in more detail with respect to FIG. 4, take the page image as input and output bounding boxes, if any, corresponding to the particular visual elements that the computer vision model is trained to identify. The bounding boxes can include a label, for example, for each signature line identified by the computer vision model the output can include a bounding box around the signature line with the label "signature line." Similarly, a bounding box around a checkbox can be labeled as a "checked" or "unchecked" checkbox. In particular the identified visual elements can include the coordinates for the corresponding bounding box and a specific label that can be assigned to a unique token.

The system preprocesses visual and text data 310. In particular, the visual elements identified by the one or more computer vision models 308 are combined with the encoded text data 304 extracted from the page metadata 302. Combining the visual elements from the computer vision models with text data can include using the position information for each bounding box and determining where to locate the visual element within the sequential text data. In other words, the text data can be tokenized into discrete tokens corresponding, for example, to individual words of the page. These words have a sequential ordering so that the relative position of each word within the page is known. This ordering can be based on how a page of text is typically read, e.g., from top to bottom and from left to right. Similarly, the location on the page of each bounding box corresponding to an identified visual element is also known based on the coordinate values of the bounding box. A resulting sequence of combined text and visual element tokens can therefore be generated.

One or more rules or conventions can be applied to insert information about a visual element into the sequence of tokens as a visual element token. For example, a rule can indicate that a token for a checkbox visual element is inserted to the left of text occurring after the location of the bounding box associated with the checkbox visual element. In another example, a signature line element can be positioned at a location so that token is located relative to a text token positioned below the signature line visual element.

The set of tokens corresponding to the text data and the visual elements are then input to a special token transformer machine learning model 312 that is trained to generate predicted classifications based on both text based tokens and particular visual element tokens located relative to the text. An example of a transformer machine learning model is described below with respect to FIG. 5. The special token transformer machine learning model outputs a predicted classification of particular text tokens as associated with respective visual elements. For example, one or more tokens to the right of a checkbox visual element can be classified as belonging to the checkbox visual element. Similarly, one or more tokens beneath a signature line visual element can be classified as belonging to the signature line. Thus, the output classification for a signature line can include a set of text tokens and a classification category such as "signatory name." The classification can have an associated probability indicating how likely, e.g., that the tokens correspond to a signatory name.

The output classifications are post processed at a post process entities step 314. The post processing can include collecting the set of classifications with their corresponding values, e.g., into a list. For example, the list can include a classification "checked checkbox" paired a value of the corresponding token or tokens, e.g., "condominium." In another example, the list can further include a classification "signatory" paired with the value of the corresponding token or tokens, e.g., "John Smith."

This information is then added to the page metadata 302 to generate updated page metadata 316 which is provided to post process document data 208 of FIG. 2 to generate updated document pages 210 for further downstream processing. In some implementations, the system collects all classifications for a document together and then performs further processing downstream, e.g., validation.

Computer Vision Models

FIG. 4 is an example region-based convolutional neural network 400 that can be used to provide a computer vision model suitable to identify particular visual elements within a document page.

A convolutional neural network can generate one or more predictions for each input image. For example, the convolutional neural network can generate predictions of the locations of bounding boxes in the page image corresponding to particular classification types of a set of classification types. A convolutional neural network includes multiple convolution layers. For given input, the convolution layers each extract image features from which a feature map is generated. The convolutional neural network can be trained, for example, during model training 412 using training data 414.

The region-based convolutional neural network 400 generates one or more predictions for each input image. For example, the region-based convolutional neural network 400 can generate predictions of the locations of bounding boxes in the image corresponding to particular classification types of a set of classification types, e.g., signature lines, checked checkboxes, and unchecked checkboxes. The region-based convolutional neural network includes a deep neural network backbone 404 (e.g., a convolutional neural network), a region proposal network 410, and a classification network 414.

An input image 402, e.g., a document page image, is provided to the convolutional neural network backbone 404. The convolutional neural network backbone 404 includes a number of convolution layers 406. The convolution layers 406 extract image features to generate a feature map 408, e.g., by applying multiple filters to the input image or to other feature maps in deeper layers, to extract different features. The convolutional neural network can include other types of layers including pooling layers and fully connected layers.

The feature map 408 is provided to the region proposal network 410. The region proposal network 410 generates regions of the image that are likely to contain objects of interest, e.g., signature lines or checkboxes. These regions are combined with the feature map 408 to generate a combination of regions relative to the feature map 412. This is then input into the classification network 414. The classification network 414 attempts to classify the contents of each region as well as refine a bounding box dimension for each of the regions to generate one or more labeled bounding boxes 416 for the input image.

In some implementations, the input image is a page of a document associated with a real estate transaction. The image is input to the region-based convolutional neural network 400. The output prediction can include a prediction of the location of bounding boxes surrounding particular visual elements contained within the page of the document and a predicted classification of the content within each of those bounding boxes. In particular, each page can be input to a separate convolutional neural network model trained to identify particular types of visual elements using examples of that page from a collection of documents.

Training the computer vision models can include obtaining a collection of training examples and using the training examples, by a training system, to determine model parameters that result in output classifications that match expected results e.g., of the training data or a validation set of data. The training examples includes a collection of images. Each image includes a set of coordinates defining respective bounding boxes and corresponding labels. The training data can be composed of a human-labeled set alone, or labeled images generated through data augmentation.

Human-labeled images each contain drawn bounding boxes and corresponding labels classifying the content of each bounding box. Each bounding box indicates a portion of a document represented by the image in which content corresponding to the label can be found.

Data augmentation allows for a smaller set of human-labeled documents to be used to generate a larger set of documents that introduces variance to the training set. For example, a particular human-labeled document can be augmented to adjust scaling, x or y axis translation, rotation, or change a contrast of text of the document to add variance. For example, an image can be augmented to simulate human induced variances in both form document generation as well as scanning or other techniques used to capture the image. The labeled bounding boxes are transformed according to the augmentation applied, e.g., if a document is scaled the bounding box coordinates of the augmented version of the document are adjusted accordingly. Similarly, if content of an image is translated along the x-axis by a particular amount, a corresponding translation can be applied to the baseline bounding box coordinates.

The training system can generate, for each training example, one or more predictions of bounding box locations and corresponding classification labels. A training engine analyzes the object predictions and compares the object predictions to the labels in the training examples. The training engine then generates updated model parameter values by using an appropriate updating technique. The training engine can then update the collection of model parameter values using the updated model parameter values.

After training is complete, the training system can use a final set of model parameter values to form a trained neural network model. The trained neural network model can be used to make predictions based on incoming images.

In some implementations, the training data is based on a set of documents associated with real estate transactions, e.g., closing packages, that have been human labeled or augmented to identify bounding boxes and labeled classifications for each bounding box. For example, each human labeled closing disclosure can have hard coded bounding boxed defined for each field in the form such as fields corresponding to for example, signature lines and checkboxes (checked and unchecked). The system is trained so that, for a given input page of a document, predictions of bounding box locations and their classification can be output.

Transformer Machine Learning Models

Figure 5:
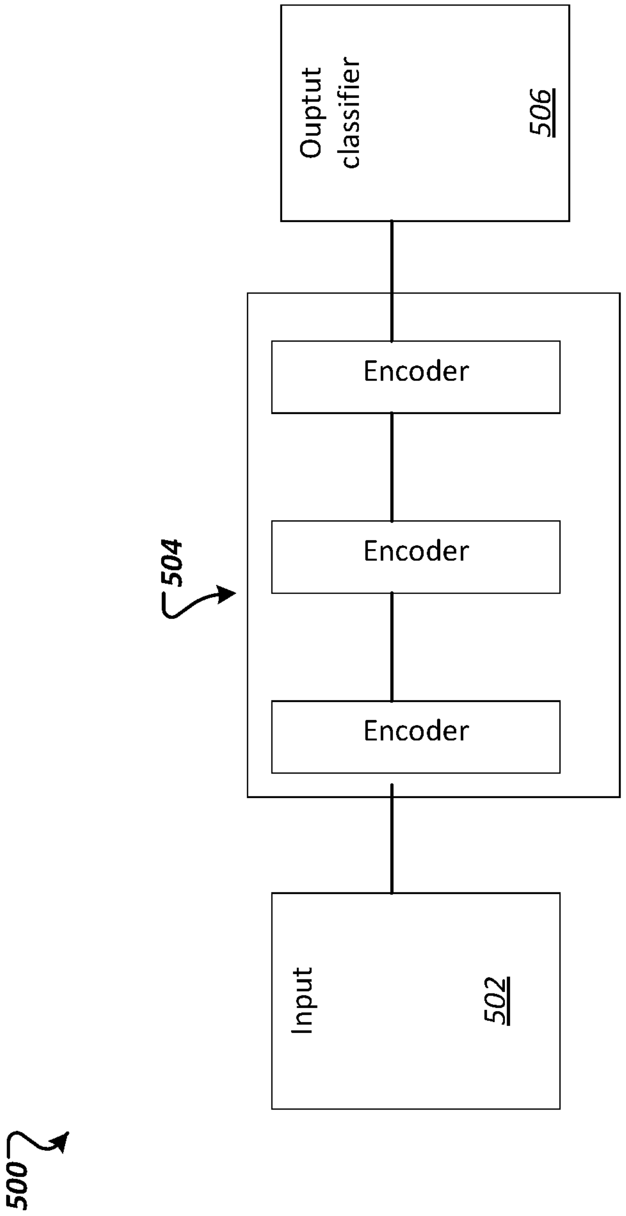
FIG. 5 is a diagram of an example transformer machine learning model.

FIG. 5 is an example is a diagram of an example transformer machine learning model.

In particular FIG. 5 illustrates the encoder of a transformer block. The objective of the transformer is to use self-attention to relate every token in the input string to every other token of the input string. Different encoder layers score different relationships based, for example, on different possible semantic meanings of the input string. The output of the encoder layers is then scored and fed into a classifier layer to generate an output prediction of a particular class or category based on the scored embedding input.

After an input sequence is converted into a numerical representation, the numerical representation 502 is submitted to the first encoder layer of a set of encoder layers 504. Typically, each encoder layer of the set of encoder layers 504 has a same architecture. However, each encoder can have a different set of parameter values as a result of the training of the attention neural network. Additionally, the input representation can have a positional encoding added before processing by the encoders. The positional encoding tracks the position of each token within the input string.

Each encoder includes a self-attention layer and a feed forward layer. The self-attention layer determines a relationship between different tokens in the input text string. In particular, the self-attention layer applies an attention mechanism to the sequence of the encoded input string. Essentially, input encoding is processed to generate an output representation based on a set of learnable weighted layers applied to the input encoding. Various forms of self-attention can be used. In some implementations, a multi-head attention is used. The feed-forward layer processes the attended sequence to generate an output sequence of the encoder layer. This output sequence is then provided to an output classifier 506 that generates an output classification. For example, the output classifier 506 generates a probability that a certain sequence of tokens is classified as belonging to a particular visual element, e.g., that text is associated with a signature line or checkbox.

Attention neural networks using transformer architecture are described in detail in Vaswani, et al., "Attention Is All You Need" in NIPS, 2017, which is incorporated here by reference.

Training the transformer machine learning model can include pre-training on a general set of data and fine tuning based on domain specific documents, e.g., documents associated with real estate transactions.

The transformer machine learning model can be trained in two stages, a base training stage and a fine tuning training stage. The base training is based on a first set of generalized training data. This first set of training data can be from a more general corpus of information, for example, a collection of books or web pages.

The fine tuning training stage is based on a second set of training data that is more domain specific. The second set of training data can include labeled examples of text string for which the actual classification is known and that is similar to the type of classifications to be made by the trained model. For example, in the context of real estate transactions, the second set of training data can correspond to a set closing disclosures (or particular component closing disclosure documents) provided by third parties and their corresponding manual classifications of particular visual elements and the associated text, e.g., names tied to signature lines and text associated with checkboxes.

For example, an input training example is input to the transformer machine learning model. In particular, the model can be a BERT based model that applies bidirectional training of the transformer. Other suitable types of transformer models can be used. Other systems conventionally train based on the left to right or right to left ordering of the input sequence. The transformer encoder, however, can take the input sequence as a whole without considering direction so that the encoder can determine a context for individual words of a text sequence based on all of the surrounding words. To do this, during training, some words of the input sequence are replaced with a mask token. The model therefore is trained to identify the original masked word based on the context provided by the other words in the input sequence.

The masked embedding of the training example is processed by the transformer. In particular, it is fed into the set of encoder layers of the transformer. In particular, the transformer can be trained using self-supervised training without a labeled target value. The transformer is trained to generate a probability that is used by a classification layer to generate a predicted classification for the input training example. In some transformer architectures, particularly BERT, the training further includes next sentence prediction.

During fine tuning, the process is the same as above, but using the second set of training data. Thus, an input training example fed into the transformer, is a domain specific example and a target classification is a corresponding label from that domain specific example. Unlike the generalized pre-training, the input training examples are not masked. This is used to generate an output prediction classifying the input training example. The fine tuning allows a generic base model to be tailored to a specific type of data. For example, a generically trained model can be fine-tuned to predict classifications of text associated with particular visual elements based on a specialized second set of labeled training data.

The specialized second set of training data can be complied from a collection of prior real estate transactions in which there is labeled pages identifying text associated with particular visual elements, e.g., signature lines and checkboxes.

Additional details on training such a machine learning model are described, for example, in Devlin et al "BERT: Pre-training of Deep Bidirectional Transformers for Language Understanding" in NAACL-HLT, 2018, which is incorporated here by reference.

In some implementations, a particular type of transformer machine learning model, a LayoutLM model, is augmented for use in evaluating the text tokens and visual tokens.

The LayoutLM model also has a BERT based architecture, but with additional input embedding types. In particular, the LayoutLM model uses embeddings that describe the positions of tokens within the document e.g., the x-y location of each text token on the page. LayoutLM can further includes image embedding repressing image features of the page. For example, visual features for words of the page can include styles like bolding and underlining of the text. In particular, the visual information generated by LayoutLM is typically generated using some high dimensional embedding using a feature extractor such as a convolutional neural network or transformer based machine learning model to identify text features.

Additional details on LayoutLM are described, for example, in Xu et al. "LayoutLM: Pre-training of Text and Layout for Document Image Understanding" arXiv: 1912.13318 (2020), which is incorporated here by reference.

The LayoutLM model is modified to include tokens representing the visual elements identified by the one or more computer vision models and trained using examples of such visual elements so that the classification can be performed relative to the visual elements. In particular, and in contrast to conventional LayoutLM, the visual elements identified through object detection are specifically not text. Furthermore, instead of using high dimensional embedding, the present system uses tokens to represent the information specific to the visual element type.

Processing Documents

Figure 6:
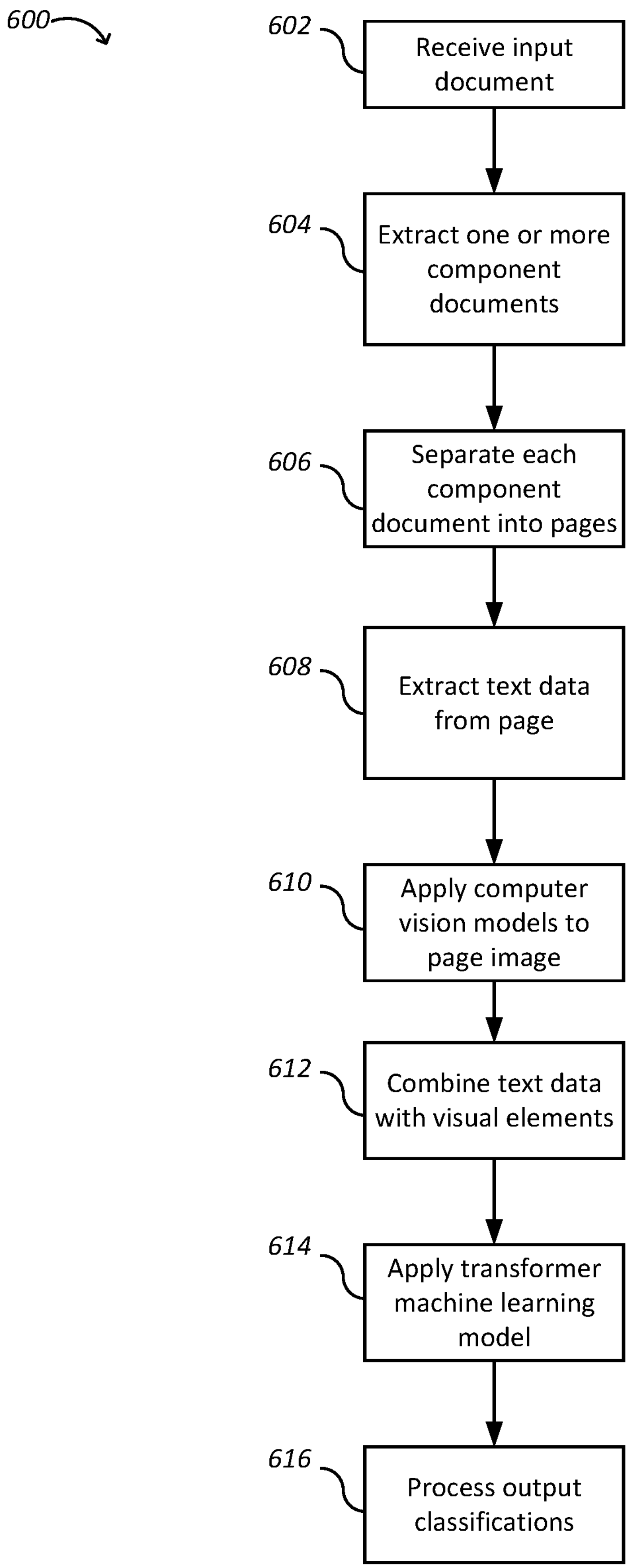
FIG. 6 is a flow diagram of an example process for classifying document content.

FIG. 6 is a flow diagram of an example process 600 for classifying document content. For convenience, the process 600 will be described as being performed by a system of one or more computers, located in one or more locations, and programmed appropriately in accordance with this specification. For example, the document analysis system 100 of FIG. 1, appropriately programmed, can perform at least part of the process 600.

The system receives a document (602). The received document can be a large package of component documents. For example, the received document can be part of a closing package of a real estate transaction.

The system extracts one or more component documents from the document (604). Various techniques can be used to recognize particular component documents, for example, based on keywords or layout information. In some cases, only particular documents are extracted.

The system separates each extracted component document into individual pages for processing (606). For example, the document can be a portion of a PDF document that can be separated into individual page images. The individual page images can be processed sequentially for each document, or in parallel.

The system extracts text data from each page (608). The text data can be encoding data stored in metadata of the document, e.g., PDF text encoding data. This data can include the text in sequence for standard reading order (top to bottom, left to right). In some implementations, the page image does not include encoded text information. In that case, an optical character recognition process can be applied to the page image to extract the text and corresponding coordinate positions.

The system applies one or more computer vision models to each page image to identify particular visual elements (610). For example, the computer vision models can be trained to identify signature lines and checked or unchecked checkboxes appearing in the page image.

The system combines the text data with the visual element data (612). In particular, information or a token representing each visual element is inserted into the sequence of text in the text data at a location relative to the respective positions in the page. For example, a visual element for a signature line is inserted into the text data at a location such that the text that appears after the visual element in the page reading order follows the insertion.

The system applies a transformer based machine learning model to the combined text and visual element data (614). The text and visual elements can be tokenized before input to the transformer based machine learning model, or can be tokenized as a first operation of the transformer based machine learning model. In either case, the model is trained to perform classifications based on input of both text and visual element tokens occurring in sequential order.

The system processes output classifications (616). Various processing can be performed on the output. The classifications for each page and corresponding text, e.g., classifications of text as being associated with particular visual elements, can be collected and appended to the page metadata of the document. The document as a whole can be further processed based on the classification results. For example, the classifications can be used in a verification process that compares the text associated with particular classification with expected data. For example, in the case of a real estate transaction, the text classified as associated with the signature line can be compared to an expected name, e.g., a party to the real estate transaction, to confirm a match. Similarly, the text classified as associated with checkboxes can be compared with contextual information about the transaction to confirm that any conditions or requirements set by the checkboxes are consistent, or that the one or more conditions or requirements are satisfied.

In some implementations, if a classification fails, or if the probability associated with the classifications is below a threshold value, the document can be routed for manual review.

The present specification describes unique and unconventional steps to solve problems associated with identifying content from images files that are distinct from the conventional approaches. In particular, errors in evaluating documents can be greatly reduced from both manual evaluation and conventional OCR techniques taken alone. The content of particular document pages can be identified and evaluated with high confidence and accuracy automatically. Using a convolutional neural network, or a region-based convolutional neural network, trained to identify particular regions of specific page images improves the functions of the system by allowing for efficient evaluation of the content of the bounding boxes that is difficult with other techniques. Moreover, applying a model to a combination to text and visual element data allows for classification of content relative to visual elements without manual action.

An electronic document, which for brevity will simply be referred to as a document, may, but need not, correspond to a file. A document may be stored in a portion of a file that holds other documents, in a single file dedicated to the document in question, or in multiple coordinated files.

In this specification, the term "database" will be used broadly to refer to any collection of data: the data does not need to be structured in any particular way, or structured at all, and it can be stored on storage devices in one or more locations.

Similarly, in this specification the term "engine" will be used broadly to refer to a software based system or subsystem that can perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

Control of the various systems described in this specification, or portions of them, can be implemented in a computer program product that includes instructions that are stored on one or more non-transitory machine-readable storage media, and that are executable on one or more processing devices. The systems described in this specification, or portions of them, can each be implemented as an apparatus, method, or electronic system that may include one or more processing devices and memory to store executable instructions to perform the operations described in this specification.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

In addition to the embodiments of the attached claims and the embodiments described above, the following embodiments are also innovative:

Embodiment 1 is a method, the method comprising: receiving one or more page images from a document; for each page image: extracting text data for the page image, providing the page image to one or more computer vision neural network model, wherein each computer vision neural network model is trained to output a predicted classification of coordinates for one or more regions within the image as belonging to a classification associated with a visual element of the page, combining the extracted text data and information associated with the visual elements identified by the one or more computer vision neural network models to generate combined page data, and providing the combined page data to a transformer based machine learning model configured to generate prediction that particular text of the page is classified as being associated with a particular visual element of the page; and using the output classifications of each page to perform verification operations on the document content.

Embodiment 2 is the method of embodiment 1, wherein performing verification operations comprises analyzing the text associated with each classification to evaluate one or more of external consistency with other data records or internal consistency with content from another portion of the document.

Embodiment 3 is the method of any one of embodiments 1 through 2, wherein providing the page image to one or more computer vision neural network models comprises:

providing the page image to a first computer vision neural network model configured to identify signature lines within the page image; and providing the page image to a second computer vision neural network model configured to identify checked and unchecked checkboxes within the page image.

Embodiment 4 is the method of any one of embodiments 1 through 3, wherein the text data comprises a sequential set of tokens in page reading order and wherein combining the extracted text data and information associated with the visual elements identified by the one or more computer vision neural network models comprises inserting a representation or token corresponding to the visual element within the sequence of text tokens at a location corresponding to the relative positions of the visual element on the page and the text tokens.

Embodiment 5 is the method of any one of embodiments 1 through 4, wherein: providing the combined page data to a transformer based machine learning model comprise providing the combined page data as input to a modified LayoutLM model.

Embodiment 6 is the method of any one of embodiments 1 through 5, further comprising: obtaining a base trained transformer based machine learning model, the base trained transformer based machine learning model having been trained using a generic corpus of training examples; and fine tuning the based trained transformer based machine learning model using a domain specific set of training examples.

Embodiment 7 is the method of any one of embodiments 1 through 6, wherein each computer vision neural network model is a region based convolutional neural network model and wherein the region-based convolutional neural network for a particular page type is trained based on a collection of labeled images defining coordinates of regions of interest in a collection of documents having the same page type along with labeled classifications for each region of interest.

Embodiment 8 is a system comprising: one or more computers and one or more storage devices storing instructions that are operable, when executed by the one or more computers, to cause the one or more computers to perform the method of any one of embodiments 1 to 7.

Embodiment 9 is a computer storage medium encoded with a computer program, the program comprising instructions that are operable, when executed by data processing apparatus, to cause the data processing apparatus to perform the method of any one of embodiments 1 to 7.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:

receiving one or more page images from a document, and for each page image:

providing the page image to one or more computer vision neural network models, wherein each computer vision neural network model is trained to output a predicted classification of coordinates for one or more regions within the page image as belonging to a classification associated with one or more visual elements of the document, extracting text data for the page image, combining the extracted text data and information associated with the one or more visual elements identified by the one or more computer vision neural network models to generate combined page data, wherein the extracted text data comprises a sequence of text tokens corresponding to text of the page image in page reading order, and wherein combining the extracted text data and information associated with the one or more visual elements comprises inserting a representation token corresponding to each visual element within the sequence of text tokens at a location within the sequence corresponding to a relative position of each visual element on the page image with respect to the text tokens, and providing the combined page data to a transformer-based machine learning model configured to analyze the combined page data, the transformer-based machine learning model generating a prediction that particular text of the page image is classified as being associated with a particular visual element of the page image; and using the output classifications and the prediction related to the combined page data generated by the transformer-based machine learning model for each page to perform verification operations on the document content.

2. The method of claim 1, wherein performing verification operations comprises analyzing the text associated with each classification to evaluate one or more of external consistency with other data records or internal consistency with content from another portion of the document.

3. The method of claim 1, wherein providing the page image to one or more computer vision neural network models comprises:

providing the page image to a first computer vision neural network model configured to identify signature lines within the page image; and providing the page image to a second computer vision neural network model configured to identify checked and unchecked checkboxes within the page image.

4. The method of claim 1, wherein providing the combined page data to a transformer-based machine learning model comprise providing the combined page data as input to a modified LayoutLM model.

5. The method of claim 1, further comprising:

obtaining a base trained transformer-based machine learning model, the base trained transformer-based machine learning model having been trained using a generic corpus of training examples; and fine tuning the base trained transformer-based machine learning model using a domain specific set of training examples.

6. The method of claim 1, wherein each computer vision neural network model is a region-based convolutional neural network model and wherein the region-based convolutional neural network for a particular page type is trained based on a collection of labeled images defining coordinates of regions of interest in a collection of documents having the same page type along with labeled classifications for each region of interest.

7. A system comprising:

one or more computers and one or more storage devices storing instructions that are operable, when executed by the one or more computers, to cause the one or more computers to perform operations comprising:

receiving one or more page images from a document, and for each page image:

providing the page image to one or more computer vision neural network models, wherein each computer vision neural network model is trained to output a predicted classification of coordinates for one or more regions within the page image as belonging to a classification associated with one or more visual elements of the document, extracting text data for the page image, combining the extracted text data and information associated with the one or more visual elements identified by the one or more computer vision neural network models to generate combined page data, wherein the extracted text data comprises a sequence of text tokens corresponding to text of the page image in page reading order, and wherein combining the extracted text data and information associated with the one or more visual elements comprises inserting a representation token corresponding to each visual element within the sequence of text tokens at a location within the sequence corresponding to a relative position of each visual element on the page image with respect to the text tokens, and providing the combined page data to a transformer-based machine learning model configured to analyze the combined page data, the transformer-based machine learning model generating a prediction that particular text of the page image is classified as being associated with a particular visual element of the page image; and using the output classifications and the prediction related to the combined page data generated by the transformer-based machine learning model for each page to perform verification operations on the document content.

8. The system of claim 7, wherein performing verification operations comprises analyzing the text associated with each classification to evaluate one or more of external consistency with other data records or internal consistency with content from another portion of the document.

9. The system of claim 7, wherein providing the page image to one or more computer vision neural network models comprises:

providing the page image to a first computer vision neural network model configured to identify signature lines within the page image; and providing the page image to a second computer vision neural network model configured to identify checked and unchecked checkboxes within the page image.

10. The system of claim 7, wherein providing the combined page data to a transformer based transformer-based machine learning model comprise providing the combined page data as input to a modified LayoutLM model.

11. The system of claim 7, further comprising instructions operable to cause the one or more computers to perform operations comprising:

obtaining a base trained transformer-based machine learning model, the base trained transformer-based machine learning model having been trained using a generic corpus of training examples; and fine tuning the base trained transformer-based machine learning model using a domain specific set of training examples.

12. The system of claim 7, wherein each computer vision neural network model is a region-based convolutional neural network model and wherein the region-based convolutional neural network for a particular page type is trained based on a collection of labeled images defining coordinates of regions of interest in a collection of documents having the same page type along with labeled classifications for each region of interest.

13. One or more non-transitory computer-readable storage media encoded with instructions that, when executed by one or more computers, cause the one or more computers to perform operations comprising:

receiving one or more page images from a document, and for each page image:

providing the page image to one or more computer vision neural network models, wherein each computer vision neural network model is trained to output a predicted classification of coordinates for one or more regions within the page image as belonging to a classification associated with one or more visual elements of the document, extracting text data for the page image, combining the extracted text data and information associated with the one or more visual elements identified by the one or more computer vision neural network models to generate combined page data, wherein the extracted text data comprises a sequence of text tokens corresponding to text of the page image in page reading order, and wherein combining the extracted text data and information associated with the one or more visual elements comprises inserting a representation token corresponding to each visual element within the sequence of text tokens at a location within the sequence corresponding to a relative position of each visual element on the page image with respect to the text tokens, and providing the combined page data to a transformer-based machine learning model configured to analyze the combined page data, the transformer-based machine learning model generating a prediction that particular text of the page image is classified as being associated with a particular visual element of the page image; and using the output classifications and the prediction related to the combined page data generated by the transformer-based machine learning model for each page to perform verification operations on the document content.

14. The non-transitory computer-readable storage media of claim 13, wherein performing verification operations comprises analyzing the text associated with each classification to evaluate one or more of external consistency with other data records or internal consistency with content from another portion of the document.

15. The non-transitory computer-readable storage media of claim 13, wherein providing the page image to one or more computer vision neural network models comprises:

providing the page image to a first computer vision neural network model configured to identify signature lines within the page image; and providing the page image to a second computer vision neural network model configured to identify checked and unchecked checkboxes within the page image.

16. The non-transitory computer-readable storage media of claim 13, wherein providing the combined page data to a transformer-based machine learning model comprise providing the combined page data as input to a modified LayoutLM model.

17. The non-transitory computer-readable storage media of claim 13, further comprising instructions that, when executed by one or more computers, cause the one or more computers to perform operations comprising:

obtaining a base trained transformer-based machine learning model, the base trained transformer-based machine learning model having been trained using a generic corpus of training examples; and fine tuning the base trained transformer-based machine learning model using a domain specific set of training examples.

18. The non-transitory computer-readable storage media of claim 13, wherein each computer vision neural network model is a region-based convolutional neural network model and wherein the region-based convolutional neural network for a particular page type is trained based on a collection of labeled images defining coordinates of regions of interest in a collection of documents having the same page type along with labeled classifications for each region of interest.

19. The method of claim 1, wherein performing the verification operations includes determining whether the prediction that the particular text is associated with the particular visual element is consistent with an expected document structure, and generating an indication that the document contains an inconsistency when the prediction is inconsistent with the expected document structure.

20. The method of claim 1, wherein performing the verification operations includes determining that a required visual element of the document is missing when no text is predicted to be associated with the required visual element.

21. The method of claim 1, wherein the transformer-based machine learning model analyzes contextual relationships between the representation token corresponding to the visual element and a plurality of surrounding text tokens within the token sequence.

22. The method of claim 1, wherein the representation token corresponding to each visual element further encodes positional information corresponding to coordinates of the visual element within the page image.

23. The method of claim 1, wherein the transformer-based machine learning model outputs a confidence score indicating a likelihood that the particular text is associated with the particular visual element.

24. The system of claim 7, wherein performing the verification operations includes determining whether the prediction that the particular text is associated with the particular visual element is consistent with an expected document structure, and generating an indication that the document contains an inconsistency when the prediction is inconsistent with the expected document structure.

25. The system of claim 7, wherein performing the verification operations includes determining that a required visual element of the document is missing when no text is predicted to be associated with the required visual element.

26. The system of claim 7, wherein the transformer-based machine learning model analyzes contextual relationships between the representation token corresponding to the visual element and a plurality of surrounding text tokens within the token sequence.

27. The system of claim 7, wherein the representation token corresponding to each visual element further encodes positional information corresponding to coordinates of the visual element within the page image.

28. The system of claim 7, wherein the transformer-based machine learning model outputs a confidence score indicating a likelihood that the particular text is associated with the particular visual element.

29. The non-transitory computer-readable storage media of claim 13, wherein performing the verification operations includes determining whether the prediction that the particular text is associated with the particular visual element is consistent with an expected document structure, and generating an indication that the document contains an inconsistency when the prediction is inconsistent with the expected document structure.

30. The non-transitory computer-readable storage media of claim 13, wherein performing the verification operations includes determining that a required visual element of the document is missing when no text is predicted to be associated with the required visual element.

31. The non-transitory computer-readable storage media of claim 13, wherein the transformer-based machine learning model analyzes contextual relationships between the representation token corresponding to the visual element and a plurality of surrounding text tokens within the token sequence.

32. The non-transitory computer-readable storage media of claim 13, wherein the representation token corresponding to each visual element further encodes positional information corresponding to coordinates of the visual element within the page image.

33. The non-transitory computer-readable storage media of claim 13, wherein the transformer-based machine learning model outputs a confidence score indicating a likelihood that the particular text is associated with the particular visual element.

* * * * *